United States Patent [19]
Tatsumi et al.

[11] Patent Number: 5,999,870
[45] Date of Patent: Dec. 7, 1999

[54] MOTOR-DRIVEN POWER STEERING SYSTEM FOR A VEHICLE AND A METHOD FOR CONTROLLING SAME

[75] Inventors: Takumi Tatsumi; Mitsuharu Morishita, both of Himeji, Japan

[73] Assignee: Mitsubishi Denki Kabushiki Kaisha, Tokyo, Japan

[21] Appl. No.: 07/758,460

[22] PCT Filed: Mar. 4, 1988

[86] PCT No.: PCT/JP88/00238

§ 371 Date: Oct. 31, 1988

§ 102(e) Date: Oct. 31, 1988

[87] PCT Pub. No.: WO88/06546

PCT Pub. Date: Sep. 7, 1988

Related U.S. Application Data

[63] Continuation of application No. 07/672,789, Mar. 21, 1991, abandoned, which is a continuation of application No. 07/265,674, Oct. 31, 1988, abandoned.

[30] Foreign Application Priority Data

Mar. 4, 1987 [JP] Japan .................................... 62-49678

[51] Int. Cl.⁶ .................................................. G62D 5/04
[52] U.S. Cl. ................................ 701/43; 701/31; 701/41; 180/443; 340/438
[58] Field of Search .................. 364/424.05, 424.01, 364/483; 180/79.1; 74/388 PS; 340/438, 648

[56] References Cited

U.S. PATENT DOCUMENTS

| | | | |
|---|---|---|---|
| 4,573,545 | 3/1986 | Kalns | 180/79.1 |
| 4,685,528 | 8/1987 | Suzuki et al. | 364/424.05 |
| 4,724,915 | 2/1988 | Morishita et al. | 180/79.1 |
| 4,724,916 | 2/1988 | Morishita et al. | 180/79.1 |
| 4,736,810 | 4/1988 | Morishita et al. | 180/79.1 |
| 4,741,408 | 5/1988 | Bausch et a l. | 180/79.1 |
| 4,753,310 | 6/1988 | Hashimoto | 180/79.1 |
| 4,754,828 | 7/1988 | Morishita et al. | 180/79.1 |
| 4,754,830 | 7/1988 | Morishita et al. | 180/79.1 |
| 4,757,869 | 7/1988 | Morishita et al. | 180/79.1 |
| 4,762,194 | 8/1988 | Morishita et al. | 180/79.1 |
| 4,773,010 | 9/1988 | Suzuki et al. | 180/79.1 |
| 4,778,021 | 10/1988 | Morishita et al. | 180/79.1 |
| 4,782,907 | 11/1988 | Morishita et al. | 180/140 |
| 4,786,866 | 11/1988 | Yabe et al. | 364/424.05 |
| 4,789,040 | 12/1988 | Morishita et al. | . |
| 4,830,137 | 5/1989 | Tatemoto et al. | 180/79.1 |
| 4,837,690 | 6/1989 | Morishita et al. | 364/424.05 |
| 4,842,087 | 6/1989 | Morishita et al. | 180/79.1 |
| 4,849,889 | 7/1989 | Morishita et al. | 364/424.05 |
| 4,862,366 | 8/1989 | Morishita et al. | 364/424.05 |

FOREIGN PATENT DOCUMENTS

| | | |
|---|---|---|
| 0174137 | 3/1986 | European Pat. Off. . |
| 0174138 | 3/1986 | European Pat. Off. . |
| 2577878 | 2/1985 | France . |
| 60-67262 | 9/1983 | Japan . |
| 0030462 | 2/1986 | Japan ................................... 180/79.1 |
| 0037581 | 2/1986 | Japan ................................... 180/79.1 |
| 2135642 | 1/1984 | United Kingdom . |
| 2161770 | 7/1984 | United Kingdom . |
| 2177358 | 1/1987 | United Kingdom ................. 180/79.1 |

*Primary Examiner*—Michael J. Zanelli
*Attorney, Agent, or Firm*—Leydig, Voit & Mayer, Ltd.

[57] ABSTRACT

A motor-driven power steering system for a vehicle and a method for controlling the same in which the assisting torque of a motor is transmitted through a clutch toward steerable road wheels of the vehicle for power assisting the steering motion imparted to a steering wheel by an operator. It is possible to precisely judge whether there exists a failure in the operation of the motor and/or the clutch before the clutch is connected. To this end, a certain characteristic value of the motor under no load condition is measured with the clutch disconnected, and then compared with a preset comparison value such as a reference motor current to determine whether the motor is mechanically restricted. If not, the clutch is connected. If so, the clutch is kept not connected so that an appropriate failsafe operation can be performed.

26 Claims, 5 Drawing Sheets

MOTOR-DRIVEN POWER STEERING SYSTEM FOR A VEHICLE AND A METHOD FOR CONTROLLING SAME

This application is a continuation application of Ser. No. 07/672,789, filed on Mar. 21, 1991, now abandoned, which is a continuation of application Ser. No. 07/265,674, filed on Oct. 31, 1988 now abandoned.

TECHNICAL FIELD

The present invention relates to a motor-driven power steering system for a vehicle and a method for controlling the same in which the operator-induced steering operation is power assisted by means of the rotative force of a motor.

BACKGROUND ART

In conventional motor-driven power steering systems a steering wheel is operatively connected through a steering shaft to a steering rack which is connected at its opposite ends with a pair of steerable road wheels. When the steering wheel is turned by an operator, the steerable road wheels are approximately steered in accordance with a steering force imparted to the steering wheel by the operator. On the other hand, the steering rack is operatively connected with a motor through a speed-reduction gear and an electromagnetic clutch. The driving force of the motor is transmitted through the speed-reduction gear and the electromagnetic clutch to the steering rack so as to assist the operator-induced steering motion of the steering wheel. The motor is electrically connected with a battery through a control unit and a key or ignition switch so that it is energized by the battery under the control of the control unit. The control unit is input with control signals from a steering torque sensor and a vehicle-speed sensor so as to appropriately control the operations of the motor and the electromagnetic clutch on the basis of the steering torque and the vehicle speed measured.

With the above-described conventional motor-driven power steering system, however, there is a problem that if the electromagnetic clutch is kept connected during the time when the motor fails or is mechanically restricted, the steering wheel also become arrested by the failed motor and cannot be moved or turned by the operator. To avoid this, it was proposed that the electromagnetic clutch is disconnected upon such a motor failure, for example when the steering torque sensor senses an extraordinarily large steering torque required for steering.

In this case, however, there arises another problem that the timing of disconnecting the electromagnetic clutch is unavoidably delayed, that is to say, it is difficult to disconnect the clutch immediately upon occurrence of such a motor failure since the clutch is kept connected until after the steering torque sensor senses an extraordinarily high steering torque. Thus, this solution is not so good for practical use. Further, it is necessary to make discrimination between an extraordinarily high torque required for steering resulting from mechanical restriction of the motor and that resulting from abutment of the steering wheel against a limit stop occurring when the steering wheel is fully turned to a righthand or lefthand limit position. To this end, a steering angle sensor is provided for sensing the steering angle of the front or steerable road wheels but even in this case, it is still difficult to precisely make such discrimination if an extraordinarily high steering torque is required when the steering wheel is located intermediate the righthand and lefthand limit positions. This will be caused, for example, when the front road wheels of the vehicle run onto a bump, a rock or a step on the road. In this case, it is erroneously judged that the high steering torque required, though due to large load on the front road wheels, would be caused by mechanical restriction resulting from a motor failure so that a failsafe mechanism is actuated to disconnect the electromagnetic clutch, thereby interrupting the assisting force from the motor.

DISCLOSURE OF THE INVENTION

The present invention is intended to obviate the above-described problems of the prior art.

An object of the present invention is to provide a motor-driven power steering system for a vehicle and a method for controlling the same in which it is possible to precisely judge whether or not there exists a failure in the operation of the motor with the clutch being disconnected so that a failsafe operation can be performed immediately upon a motor failure.

In order to achieve the above object, according to one aspect of the present invention, there is provided a motor-driven power steering system for a vehicle having a steering wheel operatively connected with steerable road wheels so that the steering wheel is turned by an operator to appropriately steer the steerable road wheels, the motor-driven power steering system comprising:

a torque sensor for detecting steering torque imparted to the steering wheel by an operator to generate an output signal representative of the detected steering torque;

a vehicle speed sensor for detecting the vehicle speed to generate an output signal representative of the detected vehicle speed;

a motor connected to be energized by a source of electric power for power assisting the steering motion caused by the operator through the steering wheel;

a clutch interposed in a power transmission path through which power assisting force is transmitted from the motor to the steerable road wheels for controlling the transmission of the power assisting force, the clutch being adapted to be switched on and off for selectively permitting and interrupting the transmission of the power-assisting force from the motor toward the steerable road wheels; and a control unit connected to receive output signals from the torque sensor and the vehicle speed sensor for controlling the operations of the motor and the clutch in such a manner that the power-assisting force transmitted from the motor to the steerable road wheels is adjusted in accordance with the vehicle speed and the steering torque, the control unit being operable to determine whether there exists a failure in operation of the motor before the clutch means-is connected and control the clutch and to the motor in such a manner that the clutch is permitted to be connected if no failure exists whereas the clutch means is kept disconnected so that a failsafe operation can be performed if such a failure exists.

According to another aspect of the present invention, there is provided a method for controlling a motor-driven power steering system for a vehicle in which a steering wheel is operatively connected with steerable road wheels so that it is turned by an operator to appropriately steer the steerable road wheels, and in which the steering motion imparted to the steering wheel by an operator can be power assisted by the assisting torque of a motor through a clutch, the method comprising the steps of:

measuring the travelling speed of the vehicle;

measuring the steering torque imparted to the steering wheel by an operator;

controlling the operations of the motor and the clutch in such a manner that the power-assisting force transmitted from the motor to the steerable road wheels is adjusted in accordance with the vehicle speed and the steering torque;

determining whether or not there exists a failure in operation of the motor before the clutch is connected; and controlling the clutch and the motor in such a manner that the clutch is permitted to connect if no failure exists whereas the clutch is kept disconnected so that a failsafe operation can be performed if such a failure exists.

The above and other objects, features and advantages of the present invention will become apparent from the following detailed description of a presently preferred embodiment of the invention when taken in conjunction with the accompanying drawings.

BEST MODE FOR CARRYING OUT THE INVENTION

The present invention will now be described by way of example with reference to the accompanying drawings.

Figure 1:
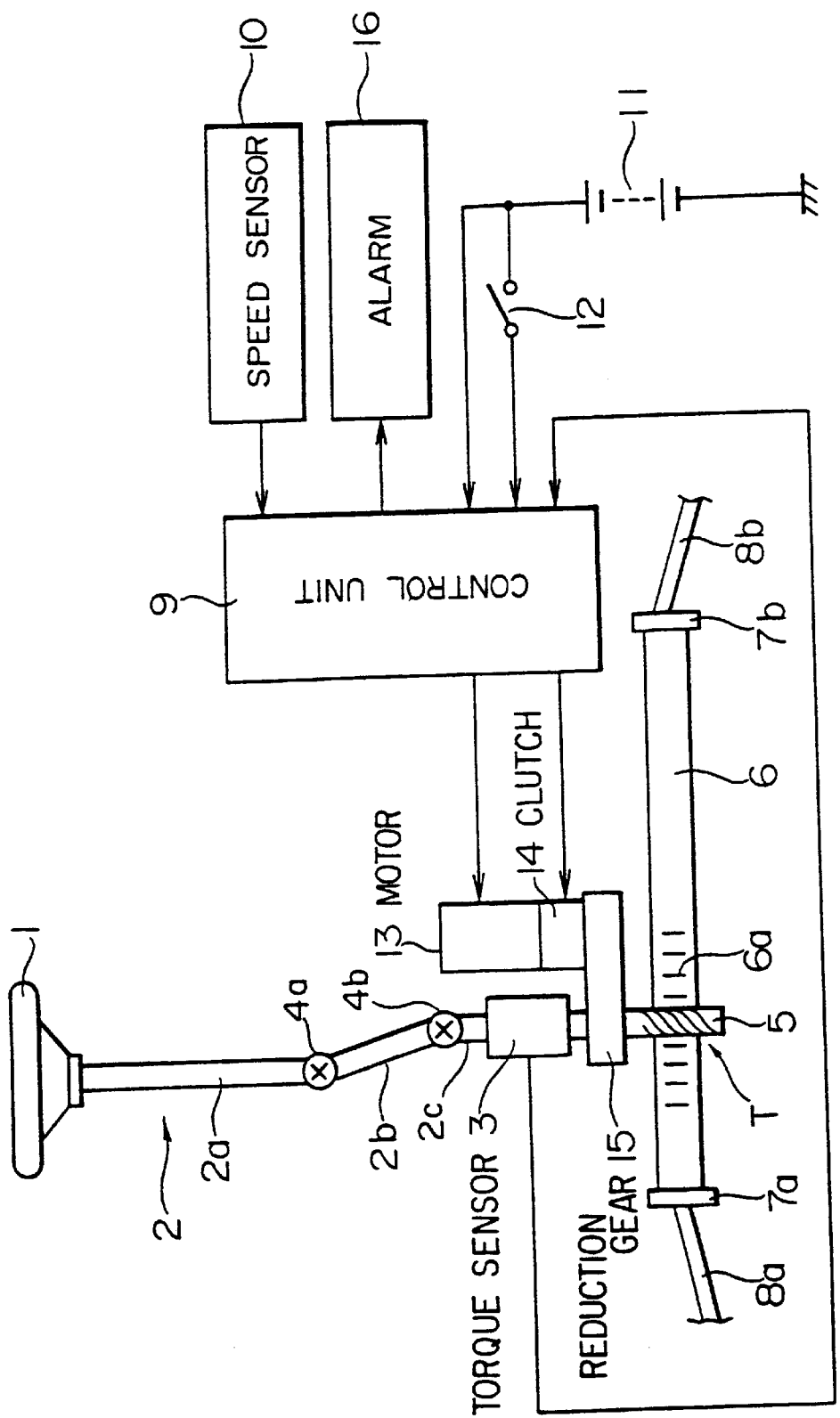
FIG. 1 is a schematic view illustrating the general arrangement of a motor-driven power steering system for a vehicle in accordance with the present invention.

Referring to the drawings and first to FIG. 1, there is schematically illustrated a motor-driven power steering system which is constructed in accordance with the principles of the present invention and which performs the method of the present invention. In FIG. 1, a steering wheel 1 is operatively connected through a steering shaft 2 and a rack and pinion gear T including a pinion 5 and a rack tooth portion 6a with a steering rack 6 the steering rack 6 has opposite ends connected to a pair of steerable road wheels (not shown) through a pair of tie rods 8a, 8b which are respectively coupled through ball joints 7a, 7b to the rack 6. When a operator turns steering wheel 1, the steerable road wheels (not shown) are appropriately steered in accordance with the steering motion of the steering wheel 1 imparted by the operator. The steering shaft 2 includes an upper shaft section 2a, an intermediate shaft section 2b and a lower shaft section 2c which are connected with each other through a first universal joint 4a and a second universal joint 4b, respectively. The lower shaft section 2c of the steering shaft 2 is operatively connected with a motor 13 in the form of a DC motor through a speed-reduction gear 15 and a clutch 14 in the form of an electromagnetic clutch. The driving force of the motor 13 is transmitted through the clutch means 14, the speed/reduction gear 15 and the rack and pinion gear T to the steering rack 6 so as to assist the steering operation of the steering wheel 1 imparted by the operator. The clutch 14 is interposed between the motor 13 and the speed reduction gear 15 and acts to make and break the mechanical connection between the motor 13 and the speed-reduction gear 15. The motor 13 is electrically connected to a battery 11 through a control unit 9 and a key or ignition switch 12 so that it is energized by the battery 11 under the control of the control unit 9. An alarm 16 in the form of a lamp, buzzer or the like is operatively associated with the control unit 9 for performing a failsafe operation including alarming a malfunction of the steering system. The control unit 9 is input with control signals from a steering torque sensor 3 and a vehicle speed sensor 10 to appropriately control the operations of the motor 13, the clutch 14 and the alarm 16 on the basis of the steering torque and the vehicle speed measured.

Figure 2:
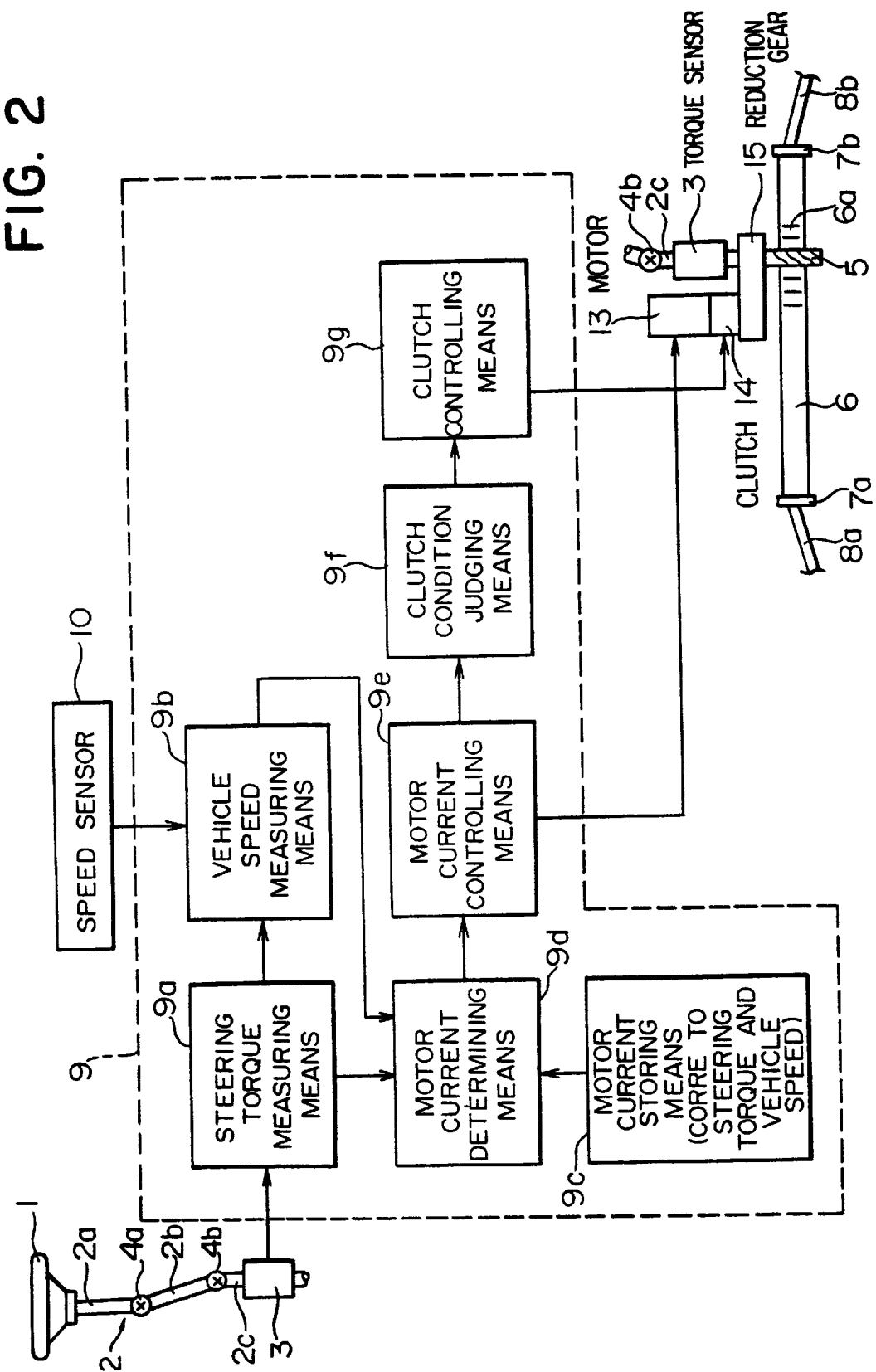
FIG. 2 is a block diagram showing a control unit and its related parts of the motor-driven power steering system of FIG. 1.

As diagrammatically illustrated in FIG. 2, the control unit 9 comprises a steering torque measuring means 9a which is connected to receive the output signal of the torque sensor 3 for measuring the operator-induced steering torque, a vehicle speed measuring means 9b which is connected to receive the output signal of the vehicle speed sensor 10 for measuring the travelling speed of the vehicle, a motor current storing means 9c which stores motor current values corresponding to varying vehicle speeds and varying steering torque values as well as comparison values such as a reference current value $I_{MB}$ and reference vehicle speed values $V_1 - V_3$ and the like, a motor current determining means 9d which is connected to receive the output signals from the steering torque measuring means 9a and the vehicle speed measuring means 9b, and which operates to read out from the motor current storing means 9c appropriate comparison values and compare them with the measured motor current and the measured vehicle speed so as to determine an appropriate current value to be supplied to the motor 13 which corresponds to the measured vehicle speed and the measured steering torque, a motor current controlling means 9e for controlling the current supplied to the electromagnetic clutch 14 in accordance with the output from the motor current determining means 9d, a clutch condition judging means 9f which judges from the results of the comparison whether the motor 13 is mechanically restricted and which operates to permit the clutch 14 to be connected if it is judged that the motor 13 is not mechanically restricted, but keep the clutch 14 disconnected so that an appropriate failsafe operation can be performed if it is judged that the motor 13 is mechanically restricted, and a clutch controlling means 9g which operates to selectively connect and disconnect the clutch 14 based on the output signal from the clutch condition judging means 9f.

Figure 3:
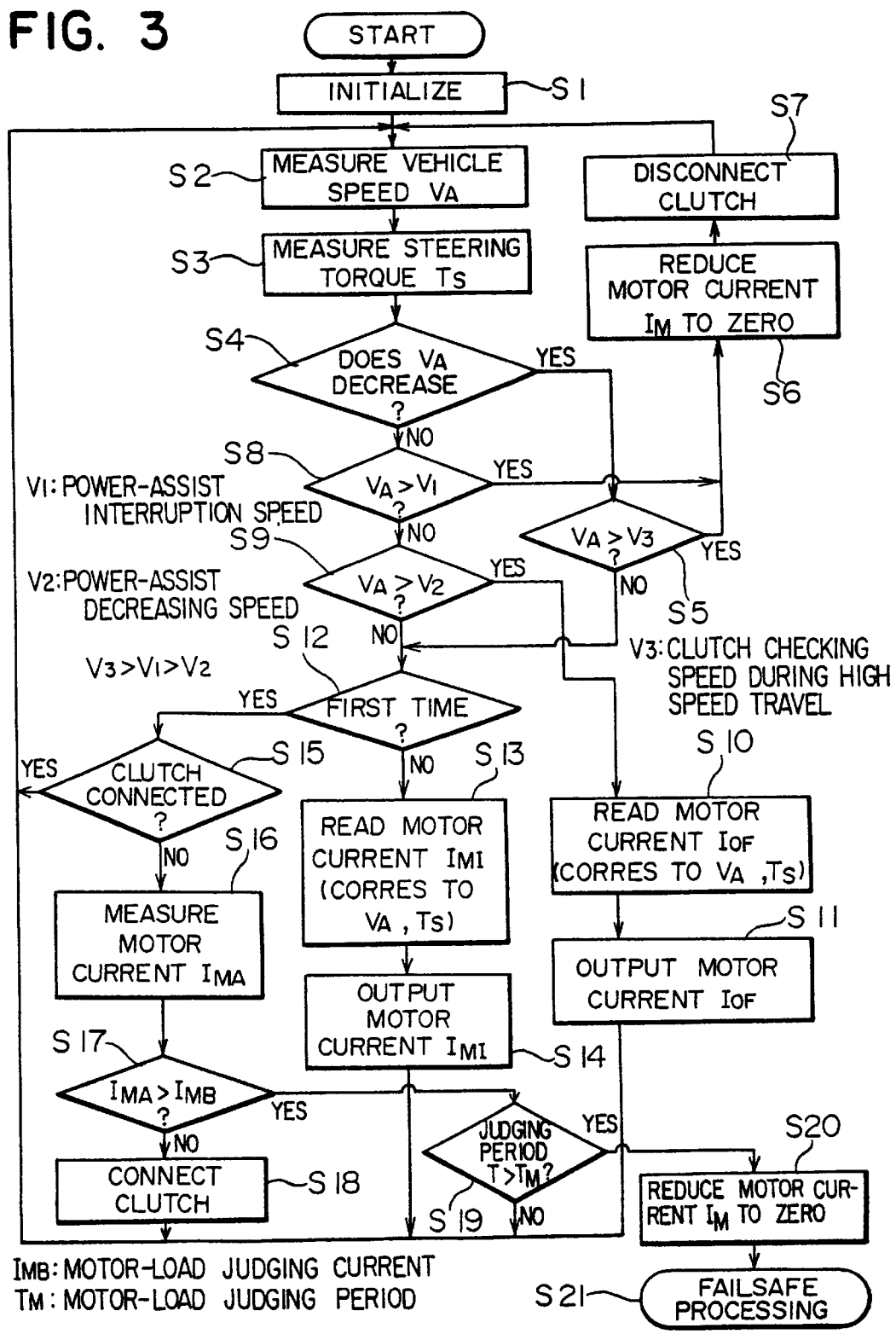
FIG. 3 is a flow chart showing a control process of the motor-driven power steering system of FIG. 1 as controlled by the control unit illustrated in FIG. 2.

Now, the operation of the above-described control unit 9 will be described in detail with reference to FIG. 3.

When the key or ignition switch 12 is first turned on to start the engine, current is supplied to the control unit 9 from the power source 11 to initialize the control unit 9 in Step S1. Then in Step S2, the vehicle speed measuring means 9b measures the vehicle speed $V_A$ from the output signal of the speed sensor 10, and in Step S3, the steering torque measuring means 9a measures from the output signal of the torque sensor 3 the steering torque $T_S$ which is imparted to the steering wheel 1 by the operator.

Subsequently, in Step S4, the motor current determining means 9d first compares the vehicle speed $V_A$ thus measured in Step S2 with the previously measured vehicle speed read out from the motor current storing means 9c or with the vehicle speed at which the control unit 9 is initialized, and then judges from the result of this comparison whether the vehicle speed is decreasing. If it is judged "YES" (i.e, the vehicle speed is decreasing), the control process proceeds to Step S5, but if "NO" (i.e., the vehicle speed is increasing), the control process proceeds to Step S8.

Figure 5:
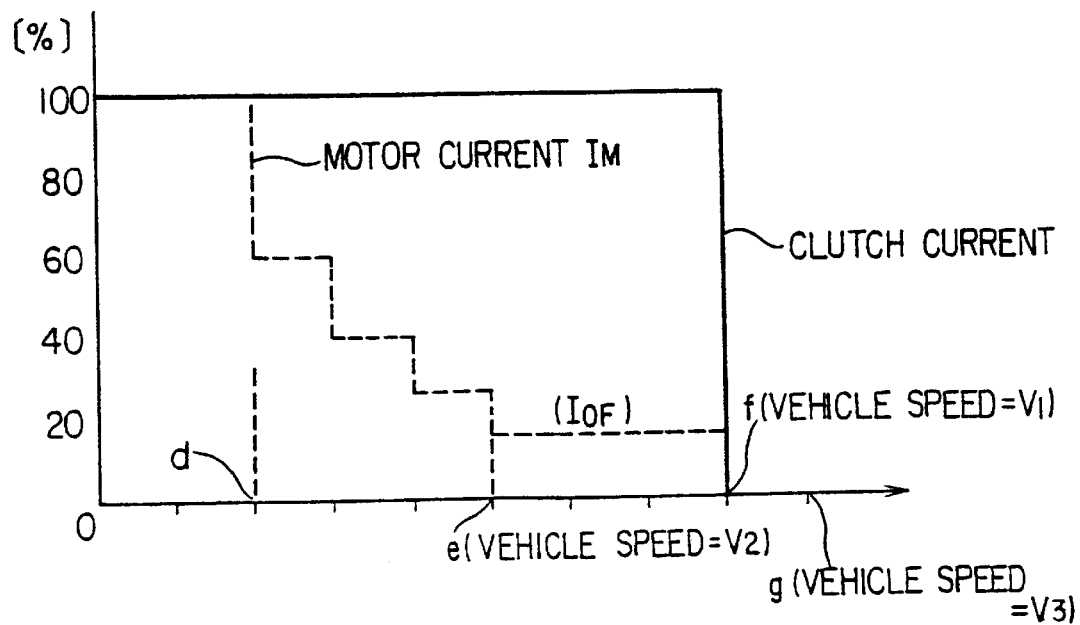
FIG. 5 is a characteristic view showing the vehicle-speed/motor-current relationship and the vehicle-speed/clutch-voltage relationship.

In Step S5, it is judged whether the vehicle speed $V_A$ is greater than a first predetermined reference level $V_3$ which corresponds to point g in FIG. 5 which represents a clutch checking speed during high-speed travel. If $V_A > V_3$, the judgement in Step S5 becomes "YES" and the control process proceeds to Step S6, but if it is judged "NO" (i.e., $V_A < V_3$), the control process proceeds to Step S12. In this connection, if the judgement in Step S5 is "YES", it is determined that the vehicle is being steered, and hence the motor current controlling means 9e reduces the current to be supplied to the motor 13 to zero in Step S6. Then, the control process proceeds to Step S7 wherein the clutch condition judging means 9f disconnects the electromagnetic clutch 14 through the clutch controlling means 9g. Thereafter, the control process returns from Step S7 to Step S2.

On the other hand, if the judgement in Step S4 is "NO", the control process proceeds from Step S4 to Step S8 wherein it is judged whether the vehicle speed $V_A$ is greater than a second predetermined reference level $V_1$ which corresponds to point f in FIG. 5 representative of a power-assist interruption speed which is less than the clutch checking speed $V_3$. If it is "YES" (i.e., $V_A > V_1$), it is determined that the vehicle is being steered and the control process proceeds to Step S6, but if "NO" (i.e., $V_1 > V_A$), the control process proceeds to Step S9 wherein it is further judged whether the vehicle speed $V_A$ is greater than a third predetermined reference level $V_2$ which corresponds to point e in FIG. 5 representative of a power-assist decreasing speed which is less than the power-assist interruption speed $V_1$.

In Step S9, if it is "YES" (i.e., $V_A > V_2$), the control process proceeds to Step S10 wherein the motor current determining means 9d reads out from the motor current storing means 9c a motor current value $I_{OF}$, which corresponds to the vehicle speed $V_A$ and the steering torque $T_S$, so as to determine an appropriate motor current $I_{MT}$. Then in Step S11, the motor current controlling means 9e controls the current $I_M$ to be supplied to the motor 13 to be IMT which is equal to $I_{OF}$, and thereafter the control process returns to Step S2.

On the other hand, if it is judged "NO" (i.e., $V_2 \geq V_A$) in Step S9, or if it is judged "NO" (i.e., $V_3 \geq V_A$) in Step S5, it is further judged in Step S12 whether the connection of the clutch 14 is effected for the first time. If it is not the first time but second or more time, then in Step S13, the motor current determining means 9d reads out a motor current value $I_{MI}$ corresponding to the vehicle speed $V_A$ and the steering torque $T_S$ as in Step S10. Thereafter in Step S14, the motor current controlling means 9e controls the current $I_M$ to be supplied to the motor 13 to be $I_{MI}$ and then the control process returns to Step S2.

If it is judged to be "for the first time" in Step S12, the control process proceeds to Step S15 wherein the clutch condition judging means 9f judges whether the electromagnetic clutch 14 has been already connected. If it is "YES", the control process returns to Step S2 whereas if "NO", the process proceeds to Step S16.

Figure 6:
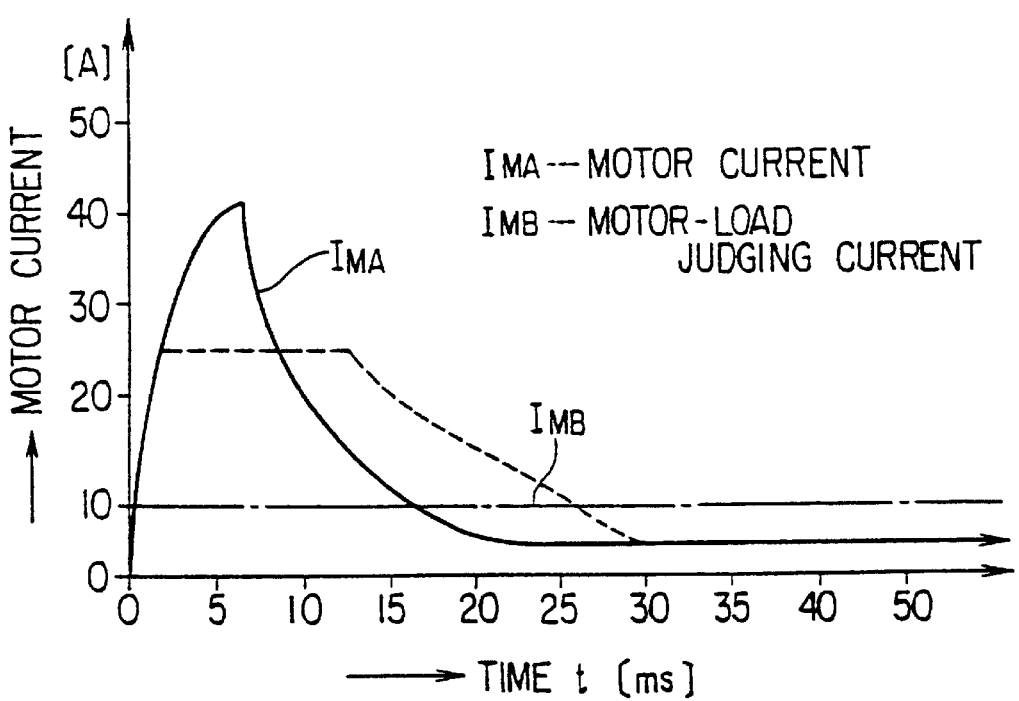
FIG. 6 is a graphic representation showing a characteristic curve of motor current during the start-up of a motor.

In Step S16, the motor current controlling means 9e acts to energize the motor 13, and the clutch condition judging means 9f measures the motor current $I_{MA}$. For example, the waveform of the motor current $I_{MA}$ developing upon energization of the motor 13 under the non-loaded condition thereof is illustrated in FIG. 6. After this measurement, in Step S17, the clutch condition judging means 9f judges whether the motor current $I_{MA}$ is greater than a reference level $I_{MB}$ which is set as a motor load judging current as shown in FIG. 6. If it is judged "NO" (i.e., $I_{MB} \geq I_{MA}$) in Step S17, it is determined that both the motor 13 and the electromagnetic clutch 14 are in normal operation, and that the motor 13 is not subjected to any mechanical restriction and operates normally. In this case, in the next Step S18, the clutch controlling means 9g receives the output signal from the clutch condition judging means 9f and switches on or connects the electromagnetic clutch 14.

On the other hand, if it is judged "YES" (i.e., $I_{MA} > I_{MB}$) in Step S17 it is considered that the motor 13 may be mechanically restricted. Thus, in this case, the control process proceeds to Step S19 wherein it is judged whether the length of a judging period T, which is the time duration from the start-up time of the motor to the time when the motor load judging current $I_{MB}$ is measured as illustrated in FIG. 6, is greater than a reference time $T_M$ which is a predetermined motor load judging period. If it is judged "NO" (i.e., $T \leq T_M$), it is determined that the motor current $I_{MA}$ measured has not yet reached a steady state, and that it is impossible to make a judgement as to whether the motor 13 is mechanically restricted. Accordingly, in this case, the control process returns to Step S2.

If the clutch condition judging means 9f judges in step S19 that the judging period T is greater than the motorload judging period $T_M$ (i.e., $T > T_M$), it is determined that the motor 13 and/or the clutch 14 is in failure, and that the motor 13 is mechanically restricted. In this case, the control process proceeds to Step S20 wherein the motor current controlling means 9e reduces the current $I_M$ to be supplied to the motor 13 to zero. Then in Step S21, the control unit 9 operates to perform a predetermined failsafe processing such as alarming the operator of the mechanical restriction of the motor 13, for example, by actuating the alarm means 16.

Here, it is to be noted that when the control process returns to Step S2 from Steps S7, S11, S14, S15, S18 or S19, the above-described process is repeated.

Further, the judgements in Steps S4, S5, S8 and S9 are made by the motor current determining means 9d by making appropriate comparison with appropriate comparison values read out from the motor current storing means 9c.

Although in Step S12, it is judged whether connection of the clutch 14 is effected for the first time, it may of course be judged whether such connection is effected at the n-th time ($n \geq 2$), i.e., at the second or certain predetermined time. Such a judgement in Step S12 can be carried out by the motor current determining means 9d or the clutch condition judging means 9f.

Now, the essential portion of operation of the above-described power steering system will be described in detail with particular reference to FIGS. 4 through 6. First, the case in which the power steering system operates normally will be considered. In this case, when the key or ignition switch 12 is turned on to start the engine, the control unit 9 is also started to operate. At this time, the electromagnetic clutch 14 is in a disconnected state and hence the motor 13 is in a non-loaded state. Under this condition, the motor 13 is once turned on to rotate for a short time for trial purposes and the control unit 9 measures the motor current $I_{MA}$ which, for example, is illustrated in FIG. 6. If the motor current $I_{MA}$ thus measured has a value below the motor load judging current value $I_{MB}$, which is for example 5 to 10 amperes, in a certain period of time, it is judged that both the motor 13 and the clutch 14 operate normally, and motor 13 is energized to rotate and the clutch 14 is also energized or switched on to make mechanical connection between the motor 13 and the speed reduction gear 15 for transmission of power assisting force from the motor 13 to the steering rack 6.

Figure 4:
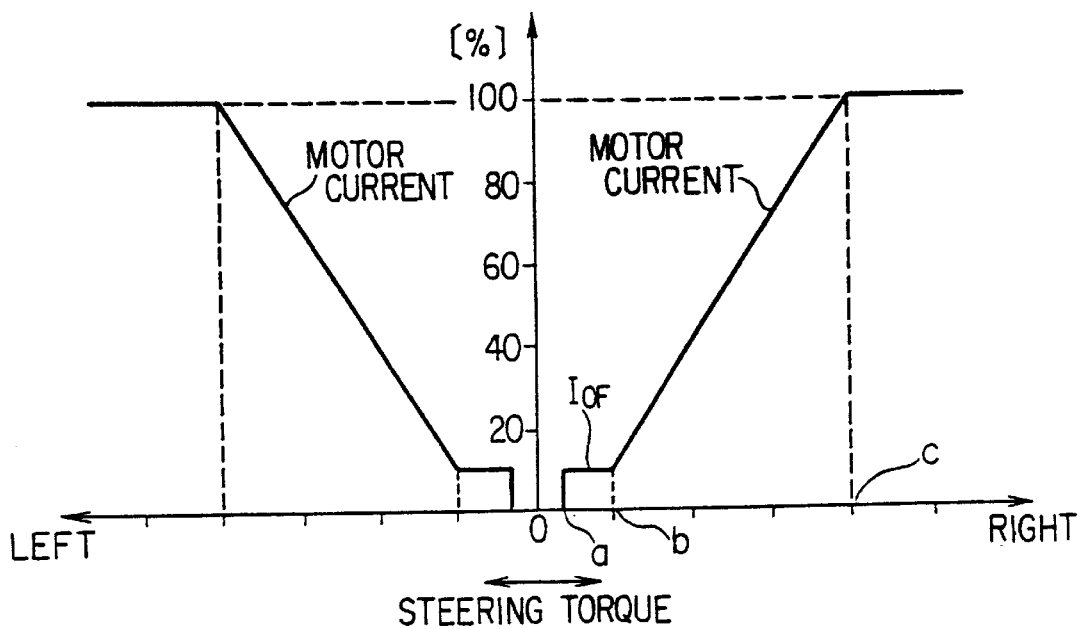
FIG. 4 is a characteristic view showing the relationship between the motor current and the steering torque.

In the connected state of the clutch 14, when the steering wheel 1 is turned by the operator, the control unit 9 acts to control the current to be supplied to the motor 13 in the manner as illustrated in FIG. 4.

More specifically, when the steering torque imparted to the steering wheel 1 by the operator increases in the clockwise or righthand direction at point a in FIG. 4, the motor 13 is turned on and supplied with an offset current of a certain low level $IO_F$ (for example, about 2 to 10 amperes) in order to alleviate the inertia influence from the motor 13 and the related mechanical portions. As the steering torque further increases, the current supplied to the motor 13 begins to increase, at point b, linearly in direct proportion to the intensity of steering torque, and reaches 100% current at point c. On the other hand, as the steering torque decreases, current flowing through the motor 13 begins to decrease at point c and becomes the offset level IOF at point b. When the steering torque further decreases and reaches point a, the current supply to the motor 13 is reduced to zero and the motor 13 is stopped. Similar to this, the motor 13 is controlled in the same manner when the steering torque increases or decreases in the counterclockwise or lefthand direction. In this connection, it is to be noted that the power assisting torque generated by the motor 13 is in direct proportion to the current supplied thereto.

Accordingly, as pictured in FIG. 4, as the steering torque increases, the motor 13 is energized or turned on at point a and supplied with the offset current $I_{OF}$. As the steering torque further increases, the current supplied to the motor 13 is gradually increased at point b so that the output torque of the motor 13 accordingly increases gradually. As a result, the assisting torque having the intensity corresponding to the operator's steering effort applied to the steering wheel 1 is transmitted to the rack tooth portion 6a on the steering rack 6 through the intermediary of the electromagnetic clutch 14 and the speed reduction gear 15, thereby lightening the steering operation for the operator.

Now, the case in which the vehicle is travelling will be considered. In this case, as seen from FIG. 5, the control unit 9 controls the operation of the motor 13 in such a manner that the current supplied to the motor 13 is controlled on the basis of the steering torque imparted to the steering wheel 1 by the operator and the travelling speed of the vehicle. For example, the motor current is controlled to change stepwise. More specifically, as illustrated in FIG. 5, the amount of current $I_M$ supplied to the motor 13 is set to be 100% until the vehicle speed $V_A$ increases above a certain level at point d, and it is decreased in a stepwise fashion as the vehicle speed $V_A$ further increases from point d. When the vehicle speed $V_A$ reaches the power assist decreasing speed $V_2$ at point e and further increases thereafter, the motor current $I_M$ is held constant at the offset level $I_{OF}$ in order to alleviate the inertia influence from the mechanical portions of the power steering system. Then, at the time when the vehicle speed $V_A$ increases and reaches the power assist interruption speed $V_1$ at point f, the current supplied to the motor 13 is made to be zero, and at the same time the electromagnetic clutch 14 is also deenergized or disconnected so that the mechanical connection between the motor 13 and the speed-reduction gear 15 is broken, thus rendering the steering system into a non-power assisted manual steering mode. Subsequently, when the vehicle speed $V_A$, having once exceeded at point q the clutch checking speed $V_3$ during high-speed travel, decreases below the clutch checking speed $V_3$, the motor 13 is caused to make a trial run. If the motor current $I_{MA}$ decreases below the motor load judging current value $I_{MB}$ after the motor load determining period $T_M$ during the start-up of the motor 13, the control unit 9 permits the electromagnetic clutch 14 to be connected, and then switches on the clutch 14 when the vehicle speed $V_A$ decreases to reach the power assist interruption speed $V_1$ at point f.

On the other hand, in cases where the motor 13 is mechanically restricted or the electromagnetic clutch 14 can not be mechanically disconnected even when it is electrically switched off, the motor current $I_{MA}$ during the trial run of the motor 13 as referred to above will not decrease below the motor load judging current value $I_{MB}$ after the motor load judging period $T_M$. In this case, the control unit 9, judging that the motor 13 is in failure, operates to interrupt power supply to the motor 13 and keep the electromagnetic clutch 14 switched off for failsafe purposes, and actuate the alarming means 16 so as to warn the operator of such a failure.

As described above, according to the present invention, the motor is first energized to make a trial run for measuring the time-related motor current characteristic before the clutch means is switched on to connect, and the measured value of motor current is compared with appropriate preset reference values so as to judge whether there exists abnormality or failure in operation of the motor. If the motor is judged to be in failure, the clutch means is kept disconnected. Thus, abnormality or failure of the motor can be detected before connection of the clutch means so that failsafe operation can be carried out immediately. Further, it is possible to judge such a motor failure independently of load conditions of the motor and hence there will be substantially no misjudgement as encountered with the prior art system, thereby providing a motor-driven steering system with a high degree of safety.

We claim:

1. A control method for a motor-driven power steering system of a vehicle, the system having a motor connected to a steering gear by a clutch, the method comprising:

testing the motor for mechanical restriction with the clutch disengaged; and engaging the clutch only if the testing determines that the motor is not mechanically restricted.

2. A control method as claimed in claim 1 wherein the testing comprises applying a voltage to the motor at a first point in time when the motor is not energized, measuring the motor current, and determining that the motor is mechanically restricted if the motor current is above a prescribed value when a prescribed length of time has elapsed since the first point in time.

3. A control method as claimed in claim 1 comprising sensing the vehicle speed, disengaging the clutch when the vehicle speed exceeds a first speed, and performing the testing when the vehicle speed is decreasing towards the first speed after having exceeded the first speed.

4. A control method as claimed in claim 3 comprising sensing the vehicle speed and performing the testing when the vehicle speed is decreasing from a second speed greater than the first speed into a range between the first and second speeds.

5. A control method as claimed in claim 1 wherein the testing is performed when the vehicle is started.

6. A control method as claimed in claim 1 further comprising generating an alarm if the testing determines that the motor is mechanically restricted.

7. A control method for a motor-driven power steering system of a vehicle, the system having a motor connected to a steering gear by a clutch, the method comprising:

sensing the vehicle speed and determining if the vehicle speed is decreasing and in a prescribed speed range;

testing the motor for abnormalities with the clutch disengaged when it is determined that the vehicle speed is decreasing and in the prescribed speed range; and engaging the clutch only if the testing determines that the motor is normal.

8. A method for controlling a motor driven power steering system comprising the steps of:

measuring travelling speed of a vehicle;

measuring steering torque imparted to a steering wheel of the vehicle by an operator;

controlling the operations of a motor and a clutch of the vehicle to adjust power assisting force transmitted from the motor to steerable road wheels of the vehicle in accordance with the vehicle travelling speed and the steering torque;

determining whether there exists a failure in operation of the motor before the clutch is connected;

connecting the clutch of the motor if no failure exists; and disconnecting the clutch and performing a failsafe operation after zero current is supplied to the motor if a failure exists;

wherein the step of determining whether there exists a failure in operation of the motor and the clutch comprises the steps of:

measuring a motor current during a start-up period of the motor before the clutch is connected;

comparing the motor current as measured during the start-up of the motor with a motor load judging current; and judging that there exists a failure in the motor if the start-up current is greater than the motor load judging current after a predetermined period of time from the turn-on of the motor.

9. A power steering apparatus for a vehicle comprising:

a motor;

a clutch connected between the motor and a steering gear of the vehicle;

a torque sensor for sensing steering torque imparted to a steering wheel of the vehicle; and a control unit comprising current supply means responsive to the torque sensor for supplying the motor with a current corresponding to the steering torque sensed by the torque sensor, clutch disengaging means for disengaging the clutch, testing means for testing the motor for mechanical restriction with the clutch disengaged, and clutch engaging means for engaging the clutch only if the testing determines that the motor is not mechanically restricted.

10. An apparatus as claimed in claim 9 wherein the testing means comprises means for applying a voltage to the motor at a first point in time when the motor is not energized, measuring the motor current, and determining that the motor is mechanically restricted if the motor current is above a prescribed value when a prescribed length of time has elapsed since the first point in time.

11. An apparatus as claimed in claim 9 further comprising a speed sensor for sensing the speed of the vehicle, wherein:

the clutch disengaging means comprises means responsive to the speed sensor for disengaging the clutch when the vehicle speed exceeds a first speed;

the testing means comprises means responsive to the speed sensor for testing the motor before the vehicle speed falls below the first speed after having exceeded the first speed; and the clutch engaging means comprises means responsive to the speed sensor for engaging the clutch when the vehicle speed falls below the first speed if the testing means determines that the motor is mechanically restricted and leaving the clutch disengaged when the vehicle speed falls below the first speed if the testing means determines that the motor is mechanically restricted.

12. An apparatus as claimed in claim 11 wherein the testing means comprises means for testing the motor each time the vehicle speed decreases from a second speed higher than the first speed into a range between the first and second speeds.

13. An apparatus as claimed in claim 9 further comprising an alarm responsive to the testing means for generating an alarm when the testing means determines that the motor is mechanically restricted.

14. An apparatus as claimed in claim 9 wherein the control unit comprises means for preventing current from being supplied to the motor when the testing means determines that the motor is mechanically restricted.

15. A power steering apparatus for a vehicle comprising:

a motor;

a clutch connected between the motor and a steering gear of the vehicle;

a torque sensor for sensing steering torque imparted to a steering wheel of the vehicle;

a speed sensor for sensing the speed of the vehicle; and a control unit comprising current supply means responsive to the torque sensor for supplying the motor with a current corresponding to the steering torque sensed by the torque sensor, clutch disengaging means responsive to the speed sensor for disengaging the clutch when the vehicle speed exceeds a first speed, testing means responsive to the speed sensor for testing the motor for abnormalities with the clutch disengaged when the vehicle speed is decreasing from a second speed greater than the first speed and is in a range between the first and second speeds, and clutch engaging means responsive to the speed sensor and the testing means for engaging the clutch when the vehicle speed decreases to the first speed if the testing determines that the motor is normal.

16. A control method for a motor driven power steering system having a motor connected to a steering gear by a clutch comprising:

sensing the vehicle speed;

testing the motor with the clutch disengaged when the vehicle speed is zero;

engaging the clutch only if the testing determines that the motor is normal;

disengaging the clutch when the vehicle speed exceeds a first speed;

retesting the motor each time the vehicle speed decreases from a second speed greater than the first speed into a range between the first and the second speeds; and engaging the clutch when the vehicle speed falls below the first speed if the testing determines that the motor is normal and leaving the clutch disengaged when the vehicle speed falls below the first speed if the testing determines that the motor is abnormal, wherein the testing comprises applying a voltage to the motor at a first point in time when the motor is not energized, measuring the motor current, and determining that the motor is abnormal if the motor current is above a prescribed value when a prescribed length of time has elapsed since the first point in time.

17. A motor driven power steering system comprising:
- a torque sensor for detecting steering torque when steering motion is imparted by an operator to a steering wheel of a vehicle having steerable road wheels by an operator to generate an output signal representative of the detected steering torque;
- a vehicle speed sensor for detecting the vehicle speed to generate an output signal representative of the detected vehicle speed;
- a motor connected to power assist the steering motion imparted to the steering wheel;
- a clutch interposed in a power transmission path through which power assisting force is transmitted from the motor to the steerable road wheels for controlling the transmission of the power assisting force, the clutch having an on-off switch input for selectively connecting and disconnecting the clutch, thereby permitting and interrupting the transmission of the power assisting force from the motor toward the steerable road wheels; and
- a control unit comprising:
  - a steering torque measuring means connected to receive the output signal from the torque sensor for measuring the operator-induced steering torque;
  - a vehicle speed measuring means connected to receive the output signal from the vehicle speed sensor for measuring the travelling speed of the vehicle;
  - a motor current storing means which stores motor current values corresponding to varying vehicle speeds and varying steering torque values, and comparison values including a reference current value and reference vehicle speed values;
  - a motor current determining means connected to receive from the motor current storing means a motor load judging current, a power assist interruption speed, and a power assist decreasing speed which is less than the power assist interruption speed, to compare the measured vehicle speed and measured motor current with the received power assist interruption and decreasing speeds and the motor load judging current, and to control the operations of the motor and the clutch to supply zero current to the motor if the vehicle speed is equal to or less than the power assist decreasing speed at a predetermined time and if the measured motor current is greater than the motor load judging current for more than a predetermined period of time with the clutch disconnected during the start-up of the motor;
  - a motor current controlling means which controls the current to be supplied to the motor in accordance with the output from the motor current determining means;
  - a clutch condition judging means for judging from the results of the comparison whether the motor is mechanically restricted and for outputting an output signal for connecting the clutch if the motor is not mechanically restricted and for disconnecting the clutch if the motor is mechanically restricted; and
  - a clutch controlling means for selectively connecting and disconnecting the clutch based on the output signal from the clutch condition judging means.

18. A motor driven power steering system as set forth in claim 17 wherein said motor current determining means performs a failsafe processing when zero current is supplied to said motor.

19. A motor driven power steering system as set forth in claim 4 wherein said motor current determining means connects said clutch if the vehicle speed is equal to or less than the power assist decreasing speed at the predetermined time and if the measured motor current is equal to or less than the motor load judging current.

20. A motor driven power steering system as set forth in claim 19, wherein said motor current determining means supplies current to said motor based on the measured vehicle speed and the measured steering torque if the vehicle speed is equal to or less than the power assist decreasing speed and if connection of said clutch has already been effected.

21. A motor driven power steering system as set forth in claim 20, wherein said motor current determining means supplies current to said motor at an offset level if the vehicle speed is equal to or less than the power assist interruption speed but greater than the power assist decreasing speed.

22. A method for controlling a motor driven power steering system comprising the steps of:
- measuring travelling speed of a vehicle;
- measuring steering torque imparted to a steering wheel of the vehicle by an operator;
- controlling the operations of a motor and a clutch of the vehicle to adjust power assisting force transmitted from the motor to steerable road wheels of the vehicle in accordance with the vehicle travelling speed and the steering torque;
- storing motor current values corresponding to varying vehicle speeds, varying steering torque values, and comparison values including a reference current value and reference vehicle speed values;
- determining whether there exists a failure in operation of the motor before the clutch is connected;
- connecting the clutch of the motor if no failure exists; and
- disconnecting the clutch and performing a failsafe operation if a failure exists;
- wherein the step of determining whether there exists a failure in operation of the motor and the clutch comprises the steps of:
  - measuring a motor current during a start-up period of the motor before the clutch is connected;
  - reading at least a reference value in the form of a motor load judging current from the stored values;
  - comparing the motor current as measured during the start-up of the motor with the motor load judging current; and
  - judging that there exists a failure in the motor if the start-up current is greater than the motor load judging current after a predetermined period of time from the turn-on of the motor.

23. A method for controlling a motor driven power steering system as set forth in claim 22, wherein:
- in the reading step, a motor load judging current, a power assist interruption speed, and a power assist decreasing speed, which is less than the power assist interruption speed, are read out as reference values, and
- in the comparing step, the measured vehicle speed and measured motor current are compared with the reference values thus read out to control the motor and the clutch to supply zero current to the motor if the vehicle speed is equal to or less than the power assist decreasing speed at a predetermined time and if the measured motor current is greater than the motor load judging current for more than a predetermined period of time with the clutch disconnected during the start-up of the motor.

24. A method for controlling a motor driven power steering system as set forth in claim 23 wherein said step of controlling the clutch includes connecting the clutch if the vehicle speed is equal to or less than the power assist decreasing speed at the predetermined time and if the measured motor current is equal to or less than the motor load judging current.

25. A method for controlling a motor driven power steering system as set forth in claim 24 wherein the current to be supplied to the motor is determined based on the measured vehicle speed and the measured steering torque if the vehicle speed is equal to or less than the power assist decreasing speed and if connection of the clutch has already been effected.

26. A method for controlling a motor driven power steering system as set forth in claim 25 wherein the current to be supplied to the motor is made to be at an offset level if the vehicle speed is equal to or less than the power assist interruption speed but greater than the power assist decreasing speed.

* * * * *